United States Patent [19]

Herman

[11] 4,110,974
[45] Sep. 5, 1978

[54] GOVERNOR

[75] Inventor: Gerald J. Herman, Farmington Hills, Mich.

[73] Assignee: Williams Research Corporation, Walled Lake, Mich.

[21] Appl. No.: 753,203

[22] Filed: Dec. 22, 1976

[51] Int. Cl.$^2$ .............................................. F02C 7/22
[52] U.S. Cl. ........................... 60/39.28 R; 60/39.74 S; 137/47
[58] Field of Search ............... 60/39.74 S, 39.74 R, 60/39.28 R; 137/47; 73/521

[56] References Cited

U.S. PATENT DOCUMENTS

| 2,664,710 | 1/1954 | Teague | 60/39.74 S |
| 3,021,675 | 2/1962 | Schroeder | 60/39.74 S |
| 3,139,892 | 7/1964 | McRoberts | 137/47 |

Primary Examiner—Robert E. Garrett
Attorney, Agent, or Firm—Harness, Dickey & Pierce

[57] ABSTRACT

An engine speed governor which utilizes the fuel mass itself as a control element, combined with fuel pressure regulation and orifice pressure drop. The fuel is fed through an orifice and then inwardly through radial slots in a shaft rotating at a speed proportional to engine speed, the rotating columns of fuel in these slots being subjected to centrifugal force and opposing external supply pressure. Equilibrium is achieved when the inlet pressure equals the sum of orifice and slot pressure drops. In the illustrated embodiment, fuel pressure is supplied by pressurizing a fuel tank with compressor discharge air, and thus pressurizing fuel in a manner compensating for slightly lower governed speed when fuel demands are higher. The illustrated embodiment also includes multiple speed selection achieved by selectively opening a plurality of bleed orifices leading from the compressor line to the fuel tank.

11 Claims, 9 Drawing Figures

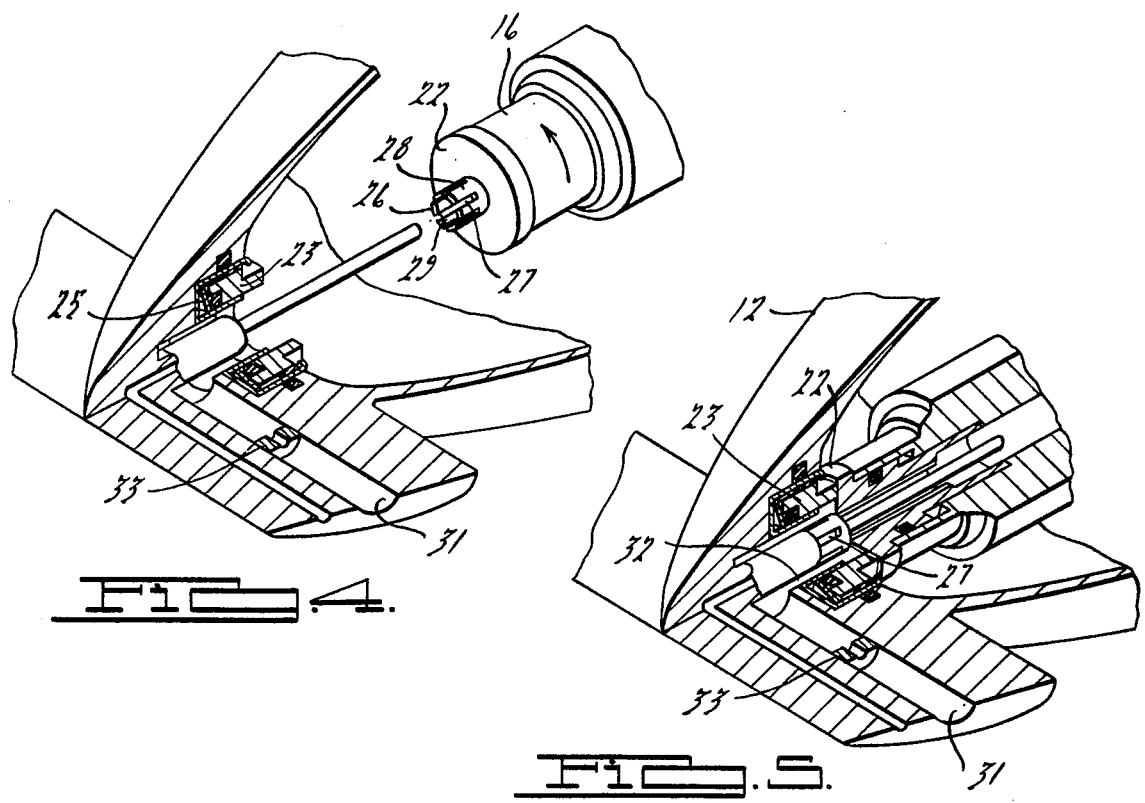
FIG. 4.
FIG. 5.
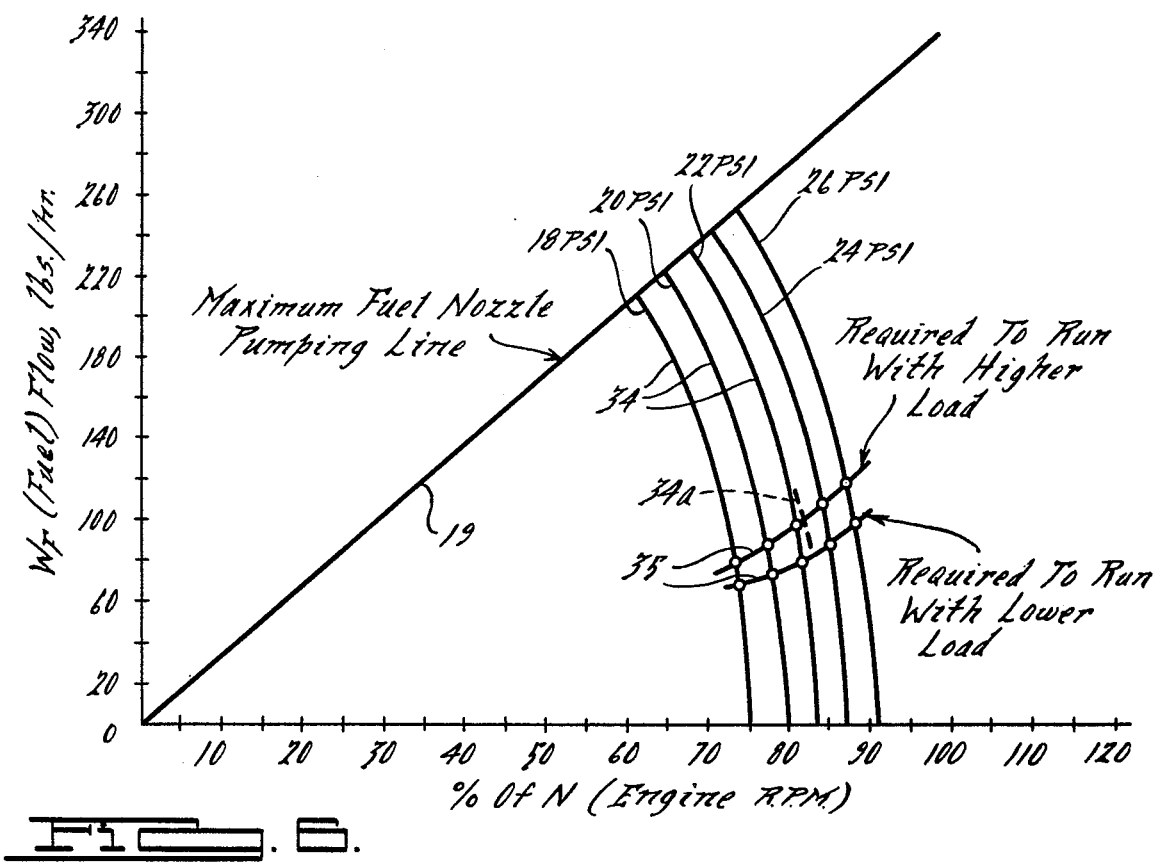
FIG. 6.

GOVERNOR

BACKGROUND OF THE INVENTION

1. Field of the Invention

The invention relates to fuel governors which control the feed of an engine such as a gas turbine engine, to maintain a constant chosen engine speed despite variations in loads.

2. Description of the Prior Art

A typical mechanical governor positions a fuel metering element by balancing the elastic force of a spring against the centrifugal force of a mass element. Another form of governor is an electronic fuel control which measures engine rotational speed which it compares with the demanded speed and positions a fuel metering valve accordingly. These previous types of governors are quite expensive to construct and are relatively complicated, having many operative or moving parts which must be maintained in good working order.

BRIEF SUMMARY OF THE INVENTION

It is an object of the present invention to provide a governor which offers a substantial cost saving over conventional governor systems and can be used in many ways and on different types of apparatus.

It is a further object to provide a governor of this nature which is relatively simple, has few moving parts and is easy to construct and maintain.

Briefly, the engine fuel governor comprises a stationary member having a fuel inlet, means for pressurizing said fuel inlet, a shaft having a bore, means connecting said shaft to said engine so as to rotate at a speed proportional to engine speed, a plurality of circumferentially spaced slots extending radially from the outer shaft surface to said bore, passageway means leading from said fuel inlet to the outer ends of said slots, whereby the centrifugal force of fuel in said slots will partially counteract the fuel inlet pressure, and fuel passageway means leading from said shaft bore to said engine.

BRIEF DESCRIPTION OF THE DRAWINGS

FIG. 4 is a fragmentary exploded perspective view of the parts in the vicinity of the shaft slots;

FIG. 5 is a view similar to FIG. 4 showing the parts assembled;

FIG. 6 is a chart showing the manner in which the invention governs fuel flow;

DESCRIPTION OF THE PREFERRED EMBODIMENT

Figure 1:
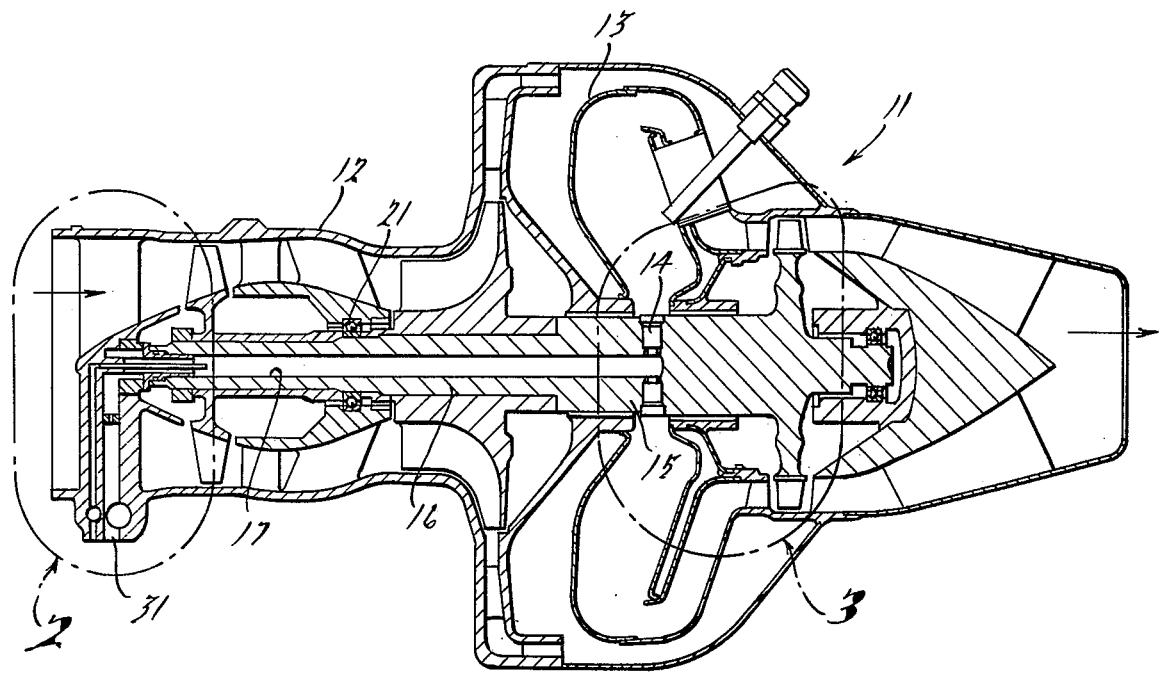
FIG. 1 is a partially schematic cross-sectional view in elevation showing the invention applied to a gas turbine engine.
Figures 2, 3:
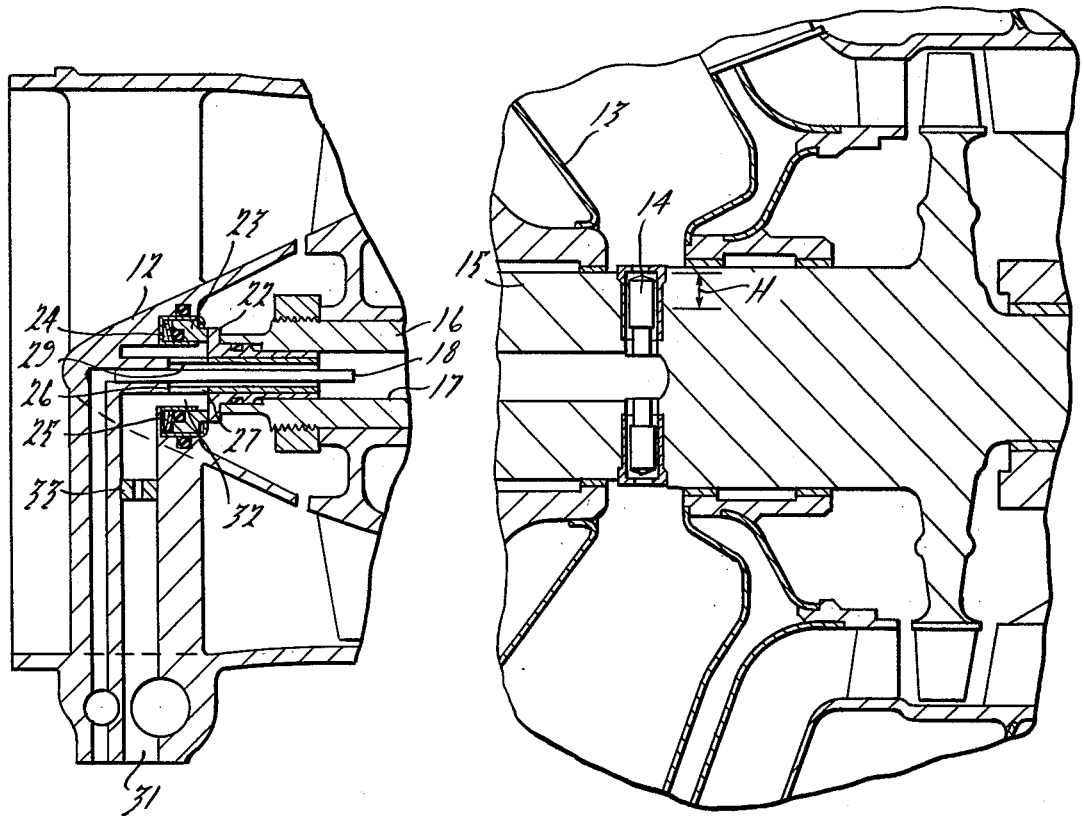
FIG. 2 is an enlarged cross-sectional view in elevation taken in the area "2" of FIG. 1 and showing the construction of the slots in the shaft.
FIG. 3 is an enlarged cross-sectional view in elevation taken in the area "3" of FIG. 1 and showing the fuel nozzles.

A gas turbine engine is shown schematically in FIG. 1 and is generally indicated at 11. The governor of this invention is shown as applied to such a gas turbine engine, although it will be understood that the invention has other applications as defined in the specification and claims. The gas turbine engine has a stationary housing shown partially at 12 and an annular combustion chamber 13. Fuel is fed to the combustion chamber by a plurality of fuel nozzles 14 carried by a nozzle supporting member 15. This is attached to an engine shaft 16 which rotates at a speed proportional to or the same as one of the engine rotor stages. Conventionally, fuel enters a central bore 17 in shaft 16 at ambient pressure. Shaft 16 then centrifugally develops the pressure required to overcome compressor discharge pressure (CDP) in combuston chamber 13 and provide fuel atomization. Since fuel enters the engine shaft at ambient pressure, provided by an engine shaft vent tube 18 (FIG. 2) carried by stationary housing 12 and projecting into bore 17, a high pressure fuel pump is not required. The fuel enters the engine shaft and gravitates to the walls of the hollow shaft through centrifugal force as the fuel rotates with the shaft. The centrifugal force creates a pressure in the fuel which causes it to move down the hollow shaft to fuel nozzles 14. The height of fuel in the nozzles builds up until the pressure head (H) (FIG. 3) is sufficient for the nozzles to flow at the same rate as the fuel is being introduced to the shaft by the control system. FIG. 6, which is described in further detail below and shows fuel flow at various governor settings as a function of engine speed, has a line 19 which indicates the maximum capacity of the nozzles to deliver fuel to the combustion chamber at different shaft speeds.

The above-described fuel injection system, while conventional in itself, is advantageously used in conjunction with the novel governor of this invention, enabling the governor to have ambient exit pressure rather than CDP exit pressure, and thus simplifying the system as will appear below.

Stationary housing 12 carries a bearing 21 (FIG. 1) for shaft 16. A fuel seal runner 22 (FIGS. 2 and 4) is disposed adjacent the end of shaft 16 and engages a stationary fuel seal member 23 such as a carbon fuel seal which is disposed in a cavity 24 in housing 12. Member 23 is urged against member 22 by spring means 25.

Minimum clearance is provided between the end 26 of shaft 16 and stationary housing 12. A plurality of radial slots 27 (FIG. 2, 4 and 5) are formed in engine shaft 16 adjacent its end 26, these slots being circumferentially arranged and extending inwardly from the outer surface 28 of the shaft to portion 29 of bore 17 which is of somewhat narrower diameter than the main portion of the bore.

A fuel inlet passage 31 is provided in stationary housing 12 which leads to an annular space 32 outwardly of shaft surface 28. A restricted orifice shown schematically at 33 is placed in series with fuel inlet passage 31.

In operation of the governor as so far described, fuel from governor cavity 32 enters the front of the engine shaft through radial slots 27. The rotating columns of fuel in these slots are subjected to centrifugal force which opposes the external supply pressure. The pressure differential across the radial slots will be a function of engine r.p.m. and inside and outside radii of the engine shaft at the slots. The pressure drop across orifice 33 will be a function of the rate of fuel flow and the orifice area.

If the inlet pressure regulator and shaft are vented to a common pressure, equilibrium of the system is achieved when the inlet pressure is equal to the sum of the orifice and slot pressure drops.

$$P_{inlet} = \Delta_{orifice} + \Delta slot$$

FIG. 6 shows the type of fuel system characteristics achieved by the novel governor of this invention for various levels of fuel inlet pressure, namely, from 18 p.s.i. to 26 p.s.i., in terms of fuel flow for various shaft speeds. The characteristics are similar to those of a mechanical governor, where fuel flow increases as speed decreases and decreases as speed increases for any given inlet pressure. This then creates a closed loop engine speed control. The droop of the curve for any given inlet pressure can be changed by lowering or raising the pressure drop of orifice 33. "Droop" refers to the steepness of curves 34; the steeper the curve, the less the droop. Maximum governor control is achieved with minimum droop, but some droop is necessary to avoid instability of the system. Enlarging the area of orifice 33 (decreasing the pressure drop across the orifice) would lessen the droop of a curve 34. It should be noted that radial slots 27 of the governor also will apparently have some orifice effect but it is preferable to have the major orifice effect in the governor system separate from the radial slots, as represented by orifice 33.

Preferably, the droop in curves 34 is adjusted to allow maximum control of the engine without encountering instability. The governed speed can be changed by changing the fluid pressure drop across the slots 27 and orifice 33. FIG. 6 also shows two "required to run" lines 35 which indicate the required fuel flow for the engine at equilibrium for different loads. The lower line 35 would represent a lower load and the upper line a higher load. The intersections of a given line 34 with two "required to run" lines 35 shows the drop in engine speed with a given fuel inlet pressure as load increases, assuming that the pressure drop across the rotating slots 27 and orifice 33 remains the same.

There are several ways of controlling pressure drop across these elements. Various schemes include regulation of inlet and exit pressure, control of inlet pressure with respect to ambient while allowing exit to be at ambient, and direct control of pressure drop itself. The fluid pressure for the system at inlet passage 31 can come from any source such as gravity feed, a fuel pump or a pressurized tank.

Figure 7:
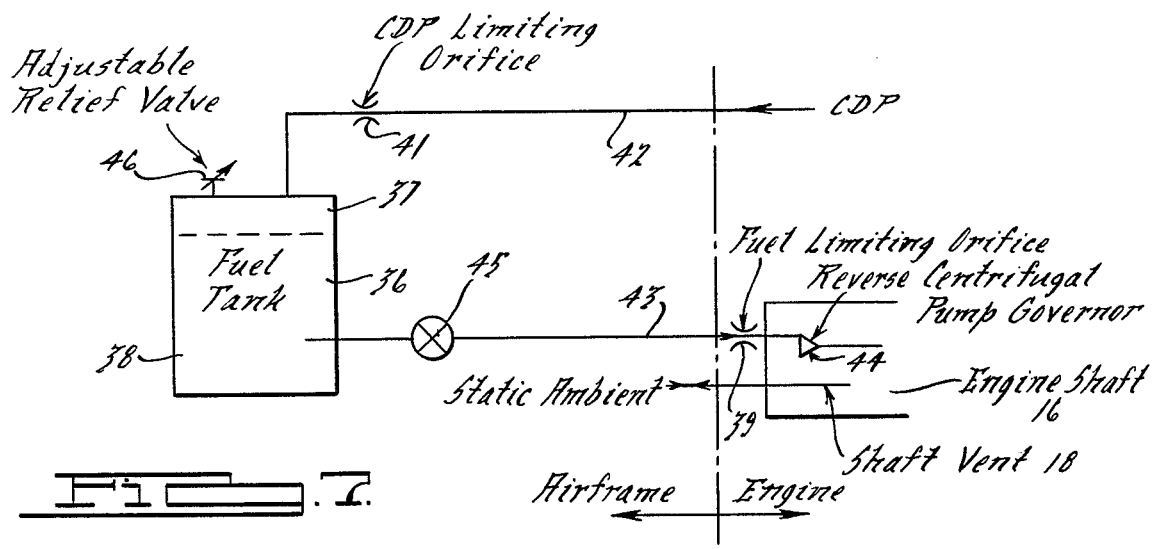
FIG. 7 is a schematic view showing an arrangement for supplying pressurized fluid for the governor.

FIG. 7 shows schematically a system useful for supplying fuel pressure to inlet 31 of the governor, which is created by pressurizing a vehicle fuel tank 36 with compressor discharge air. It is known to provide an orifice in the compressor discharge (CDP) line to a fuel tank 36, pressurizing the air chamber 37 above the fuel 38, and combining this arrangement with fuel limiting orifice 39 leadng to the engine, thus permitting the engine to be smoothly started and accelerated to speed. This has been demonstrated for air vehicle fuel tanks. The rate of engine acceleration can be varied by changing a CDP limiting orifice 41 in the CDP line 42 which limits the rate of pressurizing the fuel tank 36. The orifice 39 in the fuel line 43 establishes the proper flow versus pressure relationship.

FIG. 7 illustrates schematically the pneumatic portion of a fuel system which combines the above-described conventional fuel pressure supply means with the governor of this invention, the governor being indicated schematically and generally at 44 and being in series with and downstream from fuel limiting orifice 39. If desired, orifice 33 of governor 44 may serve as orifice 39. A shut-off solenoid 45 is also provided in the fuel line.

In operation of the system shown in FIG. 7, the pressure build-up in fuel tank 36 continues until the pressure reaches a pre-set level as determined by a pressure relief valve 46. This regulated pressure supplies the constant fuel inlet pressure to the radial inflow governor 44. The engine governed r.p.m. can be changed by simply changing the regulating pressure of fuel tank pneumatic relief valve 46.

As indicated above with respect to FIG. 6, the governing action of radial inflow governor 44 has a droop associated with it, as do typical mechanical governors. The droop results in a slightly lower speed when engine fuel demands are higher. This droop is sometimes so pronounced as to be undesirable and, in the system of this invention, can be compensated for. The CDP pressurized fuel tank 36 and the relief valve 46 with its inherent orifice effect, are used to create a "CDP reset governor" so that governed speed is almost isochronous. The regulated pressure in the fuel tank will rise slightly at higher values of CDP due to the gain (increased pressure drop) across relief valve 46. This increase in tank pressure is used to, in effect, shift the engine operation to a higher line 34 (indicated in dashed lines at 34a in FIG. 6) which maintains a more constant engine governed speed.

Figure 8:
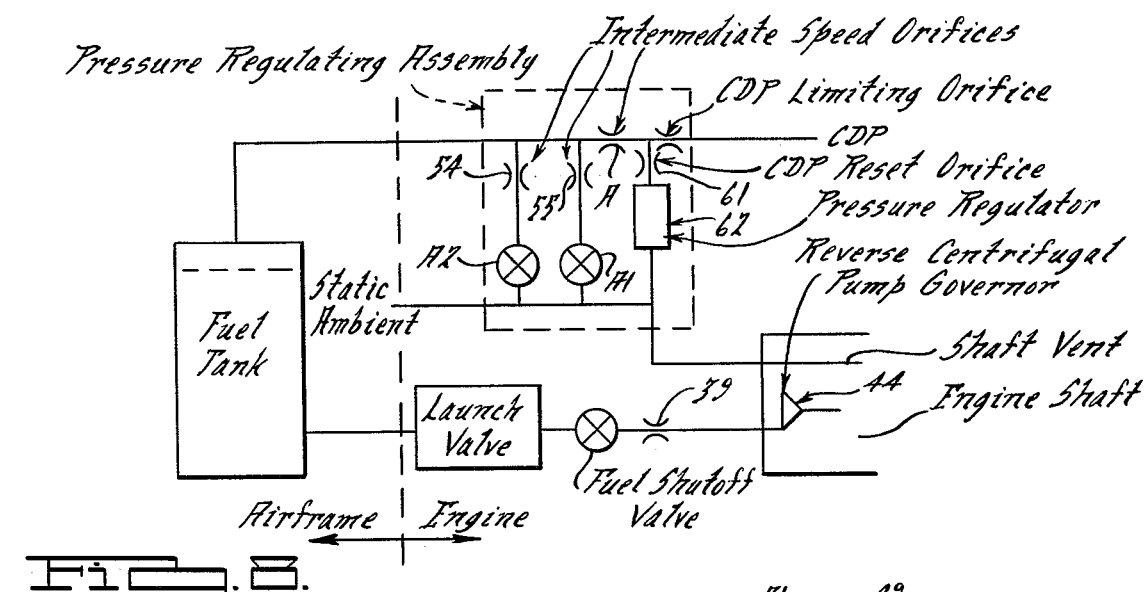
FIG. 8 is a schematic showing of a four-speed governing system.
Figure 9:
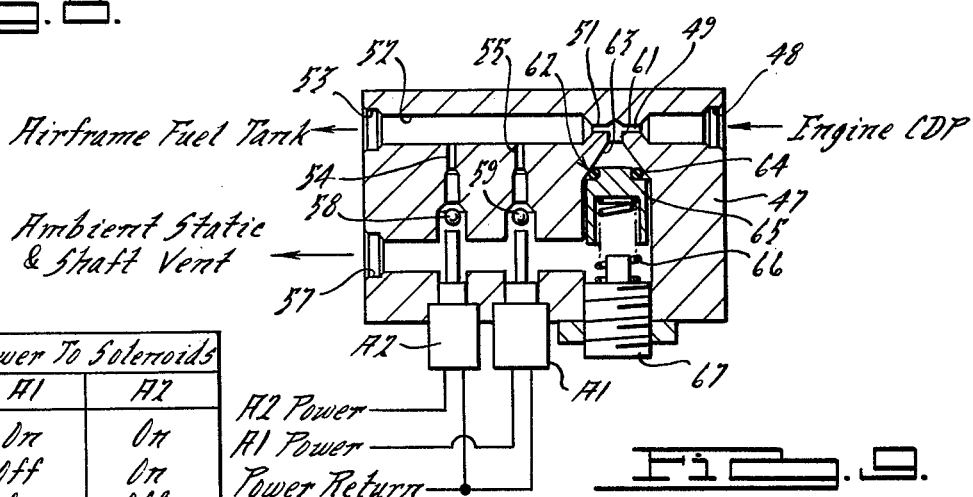
FIG. 9 is a partially schematic cross-sectional view in elevation showing the manner in which the arrangement of FIG. 8 can be constructed.

FIGS. 8 and 9 show an arrangement for regulating fuel tank pressure, and therefore engine governed speed, to various levels by using a plurality of different sized bleed orifices in lines having shutoff valves which are solenoid-controlled. By varying the opening or closing of the bleed lines one can change the fuel tank pressure and, consequently, governed speed. The arrangement comprises a housing 47 having a port 48 leading from engine CDP to a CDP limiting orifice 49. This orifice is in series with another orifice 51 used to establish an intermediate speed and then through a passage 52 to a port 53 leading to the air frame fuel tank, assuming that the engine is installed in an air-borne vehicle. A pair of additional intermediate speed orifices 54 and 55 are in relief lines leading from passageway 52, orifice 54 being somewhat larger than orifice 55. Passageways lead from the two orifices to a passageway having a port 57 which in turn leads to the ambient static and engine shaft vent. The lines for orifices 54 and 55 are controlled by a pair of valves 58 and 59 respectively, these valves being in turn controlled by plungers operated by solenoids $A_2$ and $A_1$ respectively. Valves 58 and 59 are normally open; that is, they are open when their respective solenoids are de-energized.

A CDP reset orifice 61 is connected between and leads from orifices 49 and 51. A pressure relief or regulating valve generally indicated at 62 is disposed at the outlet of orifice 61, valve 62 being similar in function to valve 46. Valve 62 comprises a flared valve seat 64 and an O-ring 64 carried by a spring-urged plunger 65, the compression of spring 66 for the plunger being adjustable by a threaded member 67.

In operation of the arrangement shown in FIGS. 5 and 6, the highest regulated pressure and, consequently 100% engine speed, is achieved when both solenoids $A_2$ and $A_1$ are activated. This will result in maximum pressure to the fuel tank as controlled by CDP reset orifice 61 and pressure relief valve or regulator 62. The term "CDP reset" refers to the fact that, as load changes, elements 61 and 62 will compensate for the droop characteristic of the governor curve as described above.

If solenoid $A_2$ is energized, air will be bled only through orifice 55 achieving, for example, 90% engine speed. If only solenoid $A_1$ is activated, orifice 54 will remain open and since this is a larger orifice, perhaps 80% of engine speed will be achieved. If neither solenoid $A_1$ or $A_2$ is energized, the bleed-off area is the largest and the engine would achieve, for example, idle speed.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

I claim:
1. An engine fuel governor comprising
   a stationary member having a fuel inlet,
   means for pressurizing said fuel inlet,
   a shaft having a bore,
   means connecting said shaft to said engine so as to rotate at a speed proportional to engine speed,
   at least one slot extending from the outer shaft surface to said bore,
   passageway means leading from said fuel inlet to the outer end of said slot, whereby the centrifugal force of fuel in said slot will partially counteract the fuel inlet pressure,
   and fuel passageway means leading from said shaft bore to said engine.
2. A governor according to claim 1, there being a plurality of circumferentially spaced slots, said engine being a gas turbine engine, said shaft bore comprising a fuel conducting bore leading from said slots, and a plurality of fuel nozzles carried by said shaft.
3. A governor according to claim 1, further provided with a tubular engine shaft vent leading from said shaft bore to the atmosphere.
4. A governor according to claim 1, there being a plurality of circumferentially spaced slots, said passageway means leading from said fuel inlet comprising an annular space in said stationary member outwardly of said slots, and a restricted orifice in said fuel inlet.
5. A governor according to claim 4, further provided with a recess in said stationary member receiving one end of said shaft, the slots being formed in said shaft end, a bearing between said stationary member and shaft adjacent said end, and a fuel seal between said stationary member and shaft outwardly of said annular space.
6. A governor according to claim 1, said means for pressurizing to said fuel inlet comprising a fuel tank having an air chamber, means for supplying air pressure to said air chamber, an adjustable relief valve for said air chamber, and a passageway leading from said fuel tank to the fuel inlet of said governor.
7. A governor according to claim 6, said governor shaft being connected to a gas turbine engine, a compressor discharge pressure (CDP) passageway leading from the compressor of said engine to said fuel tank air chamber, and a CDP limiting orifice in said last-mentioned passageway.
8. A governor according to claim 7, further provided with a plurality of relief lines having intermediate speed limiting orifices leading from said CDP passageway, said relief line orifices having different opening sizes, and means for selectively closing or opening either one or both of said relief lines, whereby fuel inlet pressure may be varied to establish intermediate governed speeds.
9. A governor according to claim 8, further provided with a valve and orifice housing, said pressure relief valve, CDP limiting orifice and intermediate speed orifices being mounted in said housing, said means for selectively closing and opening said intermediate orifices comprising selectively activatable solenoid operated plungers.
10. A governor according to claim 1, further provided with fuel supply means for said fuel inlet, and fuel restricting means in said governor.
11. A governor according to claim 1, further provided with a restricted orifice in said fuel inlet.

* * * * *